United States Patent [19]

Williams, Jr. et al.

[11] Patent Number: 5,474,239
[45] Date of Patent: Dec. 12, 1995

[54] MATERIAL SHREDDING APPARATUS

[75] Inventors: Robert M. Williams, Jr.; Robert M. Williams, Sr., both of St. Louis County, Mo.

[73] Assignee: Williams Patent Crusher & Pulverizer Company, St. Louis, Mo.

[21] Appl. No.: 231,833

[22] Filed: Apr. 25, 1994

[51] Int. Cl.⁶ ............................ B02C 23/10; B02C 23/02
[52] U.S. Cl. .................... 241/73; 241/79.1; 241/224; 241/242
[58] Field of Search .................... 241/73, 141, 142, 241/186.1, 79.1, 224, 241, 242, DIG. 31

[56] References Cited

U.S. PATENT DOCUMENTS

| | | | |
|---|---|---|---|
| 400,681 | 4/1889 | Hinkle | 241/79.1 X |
| 1,092,831 | 4/1914 | Gasser | 241/79.1 X |
| 1,151,876 | 8/1915 | Hawk | 241/73 |
| 2,381,775 | 8/1945 | Roddy | 241/73 |
| 3,472,379 | 10/1969 | Lainas et al. | 241/79.1 X |
| 3,547,358 | 12/1970 | Anderson et al. | 241/73 X |
| 3,823,878 | 7/1974 | Ishikura | 241/73 X |
| 3,893,632 | 7/1975 | Helms | 241/186.1 X |
| 3,923,256 | 12/1975 | Dorner | 241/76 |
| 4,025,990 | 5/1977 | Lovette, Jr. | 241/14 |
| 4,394,983 | 7/1983 | Ulsky | 241/243 |
| 4,422,581 | 12/1983 | Chryst | 241/66 |
| 4,706,899 | 11/1987 | Parker et al. | 241/73 |
| 4,726,530 | 2/1988 | Miller et al. | 241/24 |
| 4,896,836 | 1/1990 | Mitchell | 241/81 |
| 5,299,744 | 4/1994 | Garmater | 241/DIG. 31 X |
| 5,502,630 | 10/1994 | Hinsey et al. | 241/36 |

FOREIGN PATENT DOCUMENTS

| | | | |
|---|---|---|---|
| 11184 | 1/1979 | Japan . | |
| 84451 | 4/1993 | Japan | 241/73 |

*Primary Examiner*—Timothy V. Eley
*Attorney, Agent, or Firm*—Polster, Lieder, Woodruff & Lucchesi

[57] ABSTRACT

Material shredding apparatus for reducing scrap vehicle tires to produce two sub-products of rubber and of rubber free steel wire in which the apparatus has a shaft driven set of blocks in which each block has cutting teeth in circumferentially spaced relation, the respective blocks are keyed to the shaft so the cutting teeth on the blocks are circumferentially distributed along the shaft at 15° spacing to assure that the cutting teeth perform a cutting function one at a time to avoid excessive power consumption and the material being shredded is distributed along the set of blocks on the shaft to reduce local areas of wear.

8 Claims, 3 Drawing Sheets

MATERIAL SHREDDING APPARATUS

BACKGROUND OF THE INVENTION

1. Field of the Invention

This invention is directed to apparatus for separating composite waste material into useful fractions, and especially the recovery of the composite constituents in vehicle tires.

2. Description of the Prior Art

The problems associated with the disposal of composite waste material is the difficulty in recovering the useful fractions in forms that are acceptable for commercial processing. The disposal of vehicle tires is especially troublesome due to the incorporation of steel wire in the rubber. Separation is possible as between steel wire and rubber when an assembly of apparatus is employed for carrying out the necessary steps for progressively separating the steel wire from the enclosing rubber. The apparatus assembled to produce rubber and steel in a continuous process is taught in Miller et al U.S. Pat. No. 4,726,530 of Feb. 23, 1988. A method for crushing waste tires is taught in the Japanese Patent 11,184 of Jan. 27, 1979 issued to Osaka Gar KK, Kobe Steel. This character of separation is only economically possible in a high volume operation which results in having to discard the rubber coated steel wire while keeping the rubber which, for example, can be used as a fuel. The steel when free of rubber represents a high percentage of the tires being processed, and is a valuable asset to be recovered rather than to be discarded.

It is known to provide apparatus for recovering rubber from rubber tires by preparing the tires to cut off the beads where the steel wire is embedded before granulating the rubber. Such apparatus is found in Chryst U.S. Pat. No. 4,422,581 of Dec. 27, 1983 but no provision is made to recover the steel wire which represents about one-third of the body of tires. Another apparatus is disclosed in Mitchell U.S. Pat. No. 4,896,836 of Jan. 30, 1990 wherein the tramp metal is removed magnetically before the rubber material is introduced into a hammer mill, thereby protecting the mill hammers.

Still another type of apparatus is shown in Dorner U.S. Pat. No. 3,923,256 of Dec. 2, 1975 which works up old tires by multi-stage comminution and then sorts the tires into pieces and conveys those pieces to a magnetic separator to remove the steel containing pieces prior to grinding the remainder for reuse. In this patent it is stated that iron-containing pieces of tire sorted by magnetic means represent about 20–30% of the total quantity, and this quantity is disposed of in a manner compatible with the environment on a dump or else is treated in a thermal process.

Scrap tires can be processed to reclaim the rubber and metal in the process set forth in Lovette Jr. U.S. Pat. No. 4,025,990 of May 31, 1977 where recovery of a substantial portion of the valuable components is in a form for secondary use. This recovery is crumb rubber which is used as an additive in asphalt and paving compositions. The metal products can be used in making low grade steel products.

BRIEF SUMMARY OF THE INVENTION

The problem associated with recovery of the constituents in vehicle tires is overcome by apparatus which handles the difficulty in separating the rubber which must be free of the steel wire, and the associated difficulty of removing the rubber that coats the steel wire so there is rubber free wire. The present apparatus is capable of thereby converting tires into two useful sub-products in a single processing apparatus that, for example, can handle tires in desirable quantities at tire replacement service stations. Such apparatus avoids the problems of collecting large numbers of tires and hauling them to a high volume processing plant.

Therefore an important object of the invention is to provide in a single apparatus the ability to convert tires into two independent sub-products from a supply of tires which has been cut-up or roughly shredded into pieces, some portions of which are rubber coated steel wire. A suitable rough shredder device 10 embodied in the pending application Ser. No. 08/005,788 is incorporated by reference herein.

It is also an object of providing apparatus for processing tire pieces so that the pieces are moved by a system of cutting teeth on a common rotation shaft in a predetermined path to effect the separation of the rubber from the steel wire, whereby the steel wire can be magnetically sorted out from the rubber.

A further object is to provide a material shredding apparatus with a series of rotating blocks positioned on a common shaft, whereas each block carries multi-cutting teeth to shred the material and progressively transfer the material between the blocks so that metal and non-metal components can be separated.

Still another object is to provide shredding apparatus for material like vehicle tires that will effectively separate the rubber and steel wire while avoiding wear in the apparatus and also avoiding excessive power demands.

Other objects of the invention will be set forth in the following specification.

BRIEF DESCRIPTION OF THE DRAWINGS

A preferred embodiment of the invention is depicted in the accompanying drawings, in which.

DETAIL DESCRIPTION OF THE MATERIAL SHREDDING APPARATUS

Figure 1:
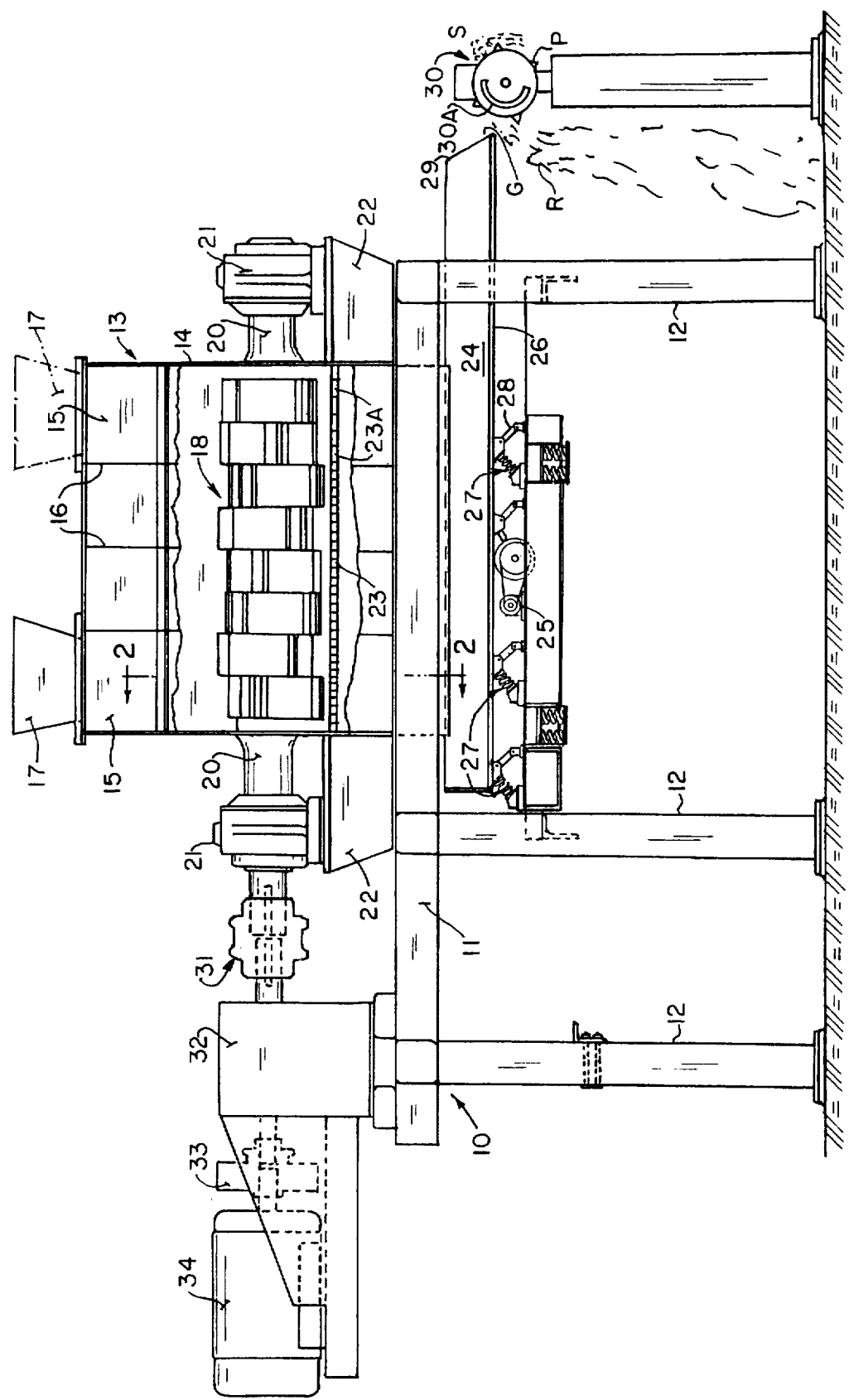
FIG. 1 is a longitudinal side elevation of apparatus for practicing the invention, the view being seen with a portion broken out to disclose a shredder shaft assembly.

A suitable apparatus for practicing the invention is shown in FIG. 1 wherein a frame structure 10 has a longitudinal bed 11 supported on legs 12. The shredder apparatus 13 consists of a vertical housing 14 having sheet metal panels 15 braced with ribs 16. The width of the left panel 15 defines the width dimension of a material inlet path 17A aligned under a feed chute 17. The housing 14 has the mid-section of the panels 15 broken out to show the shredding shaft shredding block assembly 18 which has the main shaft 19 with end portions operatively supported in suitable bearings 21 supported on a sub-bed 22. The material processed in the housing 14 is shredded by teeth on the respective blocks of the assembly 18 until it is reduced to a size that will pass through the screen 23 and be collected in a vibratory tray 24. The tray 24 is operatively vibrated by a well-known vibratory mechanism driven by motor 25. The bottom wall 26 of the tray is carried on spring means 27 in combination with pivoted links 28. The tray is caused to vibrate in a generally horizontal plane so the shredded material falling into the tray will be advanced toward a discharge end 29 which is adjacent a rotating shell 30 which houses a stationary magnetic device 30A to attract the steel wire while the rubber material falls through the gap G between the end 29 and the rotating shell 30 for the magnetic device 30A.

The shaft assembly 18 in housing 13 is rotated by suitable coupling means 31 positioned to rotate in response to a transmission assembly 32. That transmission assembly 32 is responsive to a torque clutch 33 operated by electric motor 34. The coupling 31, transmission assembly 32, clutch 33 and motor 34 may be obtained from any suitable source, just so the drive system will deliver the required torque to the shaft 20 to effectively shred the material which is initially chiefly tires steel wire embedded in the rubber material.

Figure 2:
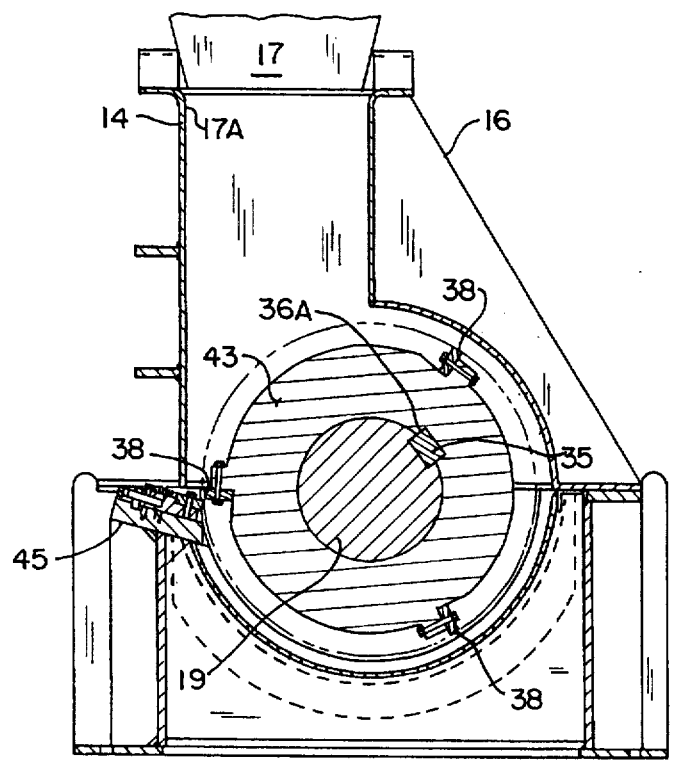
FIG. 2 is a transverse sectional view of the apparatus as seen along line 2—2 in FIG. 1.
Figure 3:
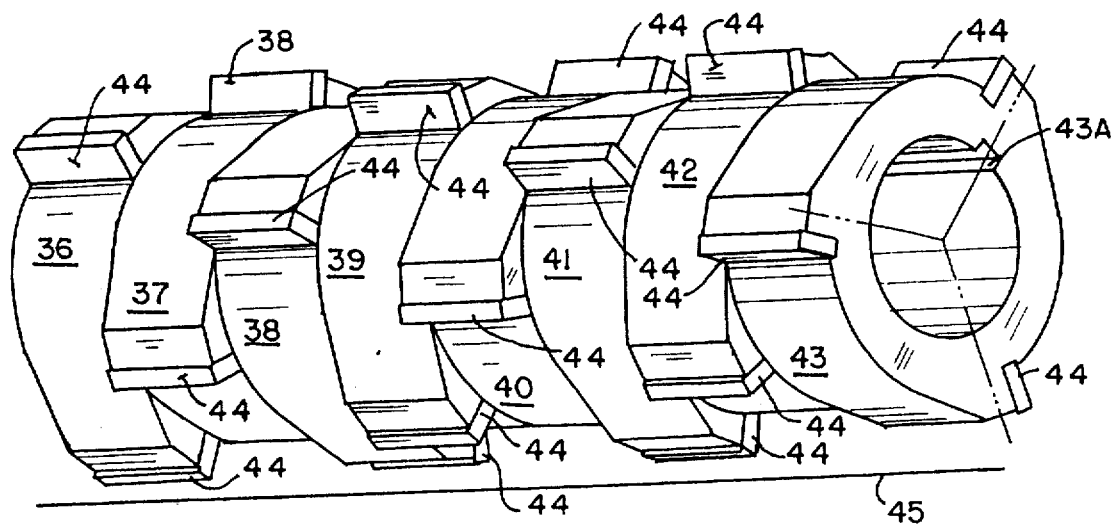
FIG. 3 is a perspective view of a single shaft having multi-cutter teeth on each of a series of rotary blocks to be associated with a common shredding knife seen in FIG. 2.

FIG. 2 illustrates the material receiving path 17 for directing the chopped up tires from the device illustrated in pending application Ser. No. 08/005,788 into feed chute 17A to be shredded. The single shaft assembly directly under the path 17A includes the driven shaft 20 having a key 35 which is common for each of the eight rotary blocks 36–43 seen in perspective in FIG. 3. Each block has its own keyway. The keyway 36A for block 43 is shown in FIG. 3 as is the keyway 43A indicated in FIG. 2 for the key 35 engaged in the first block 36. Keyway 43A receives the common key 35 for shaft 20, and this represents the position of rotation of block 36 relative to the shaft. The next adjacent rotary block 37 has its keyway (not shown) rotated to a position in which the cutting teeth 38 are off-set from the teeth 44 on block 36 by 45°. The cutting teeth on each succeeding rotary block are off-set from the adjacent block by 45° each so that by the placement of the blocks 37–43, the last or eighth block 43 will appear to lead the teeth of block 36 by 45°.

Figure 4:
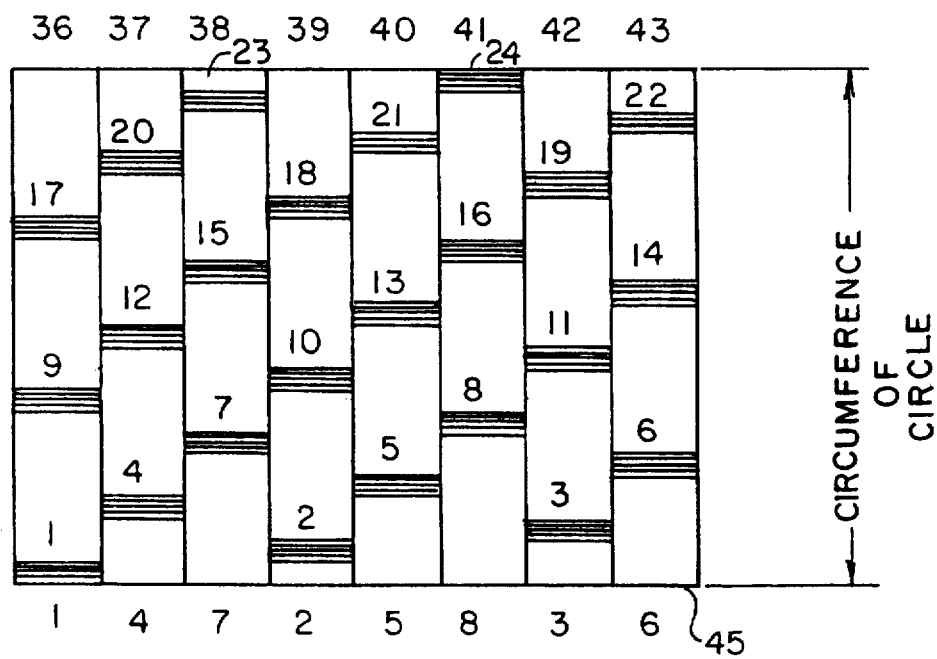
FIG. 4 is a top view of the series of multi-teeth rotary blocks illustrating the angular off-set of the teeth on the respective blocks relative to a line representing a common shredding knife.

Each rotary block keyed to the common shaft 20 carries three cutting teeth 44 spaced 120° apart. This angular spacing of the cutting teeth when related to the longitudinal blade 45 carried in the assembly 13 is represented by the line 45 in FIG. 4. Thus, it can be appreciated from FIG. 4 that each subsequent block 37, 38, 39, 40, 41, 42 and 43 is rotated by its increment of 45°. Since the respective cutting teeth 44 on each block are spaced 120° apart, it results that the teeth on the next adjacent block are angularly turned 45° so its teeth will be offset by 60° to the teeth on the first block. This angular relationship relates the spacing of teeth between block 36 and 37 at 15°. That 15° tooth offset is the same for each adjacent block, and that relationship is depicted in FIG. 4.

A second important relationship of the teeth 44 in each block 36–43 is that the teeth pass the shredding blade 45 seen in FIG. 2 one at a time. That relation is depicted in FIG. 4 by the straight line 45 in FIG. 4, and the order of teeth passing that line is indicated by the numbers placed along the line 45 as 1, 4, 7, 2, 5, 8, 3, 6. This order of passage translates by the teeth with the same numbers placed next to the teeth of the blocks spaced along the shaft 19. The geometric positions of the cutting teeth in FIG. 4 are a spiral pattern which produces a desired result that the material, when it enters the chute 17, will be progressively moved from block 36 toward the eighth block 43. As that material progresses in the rightward direction from block 36 it will progressively shred the material so that small rubber particles will fall through the holes in the screen 23. However, the steel wire will be progressively stripped of the rubber until the reduced chunks of steel wire will fall through the larger holes 23A in the screen 23, and not gang up against the end wall of the frame 14.

The apparatus of FIGS. 1–4 having reduced the tire shreds to rubber bits and rubber free steel wire, that mass of material will fall through the screen 23 into the vibratory tray 24 and be propelled to fall off the end 29 where the steel wire will be attracted by the magnet in the rotating shell 30 and be carried by the projections P on the shell to fall in a stream S off the shell 30. At the same time the rubber will fall through the gap G and form a stream R of rubber. Suitable collecting means (not shown) can be placed to receive the material in separate streams S and R so as to collect those sub-products.

Figure 5:
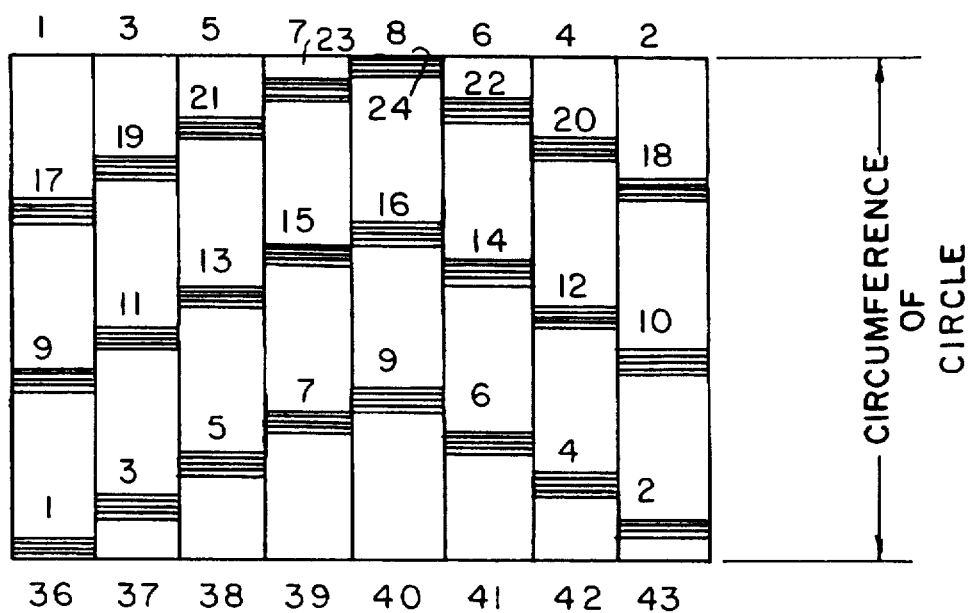
FIG. 5 is a top view of the series of multi-teeth rotary blocks, similar to FIG. 4 but illustrating an alternate angular off-set of the teeth on the respective blocks relative to the line representing a common shredding knife.

The view of FIG. 5 is an alternate plan of the blocks on the shaft 19 when laid out to show the pattern of the teeth 44 on the blocks 36–43 inclusive. Again the blade 45 of FIG. 2 is represented in FIG. 5 by the straight line 45. In order for this pattern of cutter teeth to operate as desired, the incoming chopped up material is fed by chutes 17 aligned at opposite rotor blocks 36 and 43 so the material will be progressively reduced as it moves from the opposite ends toward a more central rotor block location. In this alternate arrangement of cutting teeth in opposing spiral treatment of the material, the cutting teeth will pass the blade 45 in the order which passes from rotor block 36 to block 43, then back to block 37 and so forth from blocks that work the material toward the center in the numbered order of passing the blade 45 as shown in FIG. 5. The screen 23 must be modified so the larger openings 23A are in the center area (not shown) and the smaller openings begin at the opposite ends of the grate and progress toward the central larger openings.

The alternate arrangement of feeding the material at opposite ends of the apparatus will not require any change in the means seen in FIG. 1 for collecting the material in tray 26 and vibrating such material off the tray end 29 where the magnetic means will withdraw the rubber free steel wire from the rubber.

The material shredding apparatus disclosed in the drawings represents a preferred embodiment which may be subject to minor changes as set forth in the description to cover such changes under principles of equivalency.

What is claimed is:

1. Material shredding apparatus for shredding waste material, such as vehicle tire carcasses, comprising:

a) an elongated frame structure having a waste material chute positioned to direct waste material into said frame structure adjacent one end;

b) a driven elongated shaft operably mounted in said frame structure with one end aligned under said chute position and the opposite end remote therefrom;

c) a series of individual discs mounted on said elongated shaft to occupy the length of said shaft between the ends thereof, each individual disc carrying a plurality of teeth elements;

d) key means on said elongated shaft and keyway means in each of said individual discs, said keyway means in said individual discs being angularly offset such that said plurality of teeth elements on said individual discs are circumferentially offset; and e) an elongated shredding blade carried in said frame structure to occupy a position adjacent the path of movement of said disc teeth elements.

2. The material shredding apparatus set forth in claim 1 wherein said plurality of teeth elements on each of said individual discs are circumferentially spaced at substantially 120°.

3. The material shredding apparatus set forth in claim 2 wherein said plurality of teeth elements on each of said individual discs are circumferentially offset relative to the teeth elements on each of the other of said discs.

4. The material shredding apparatus set forth in claim 3 wherein said circumferentially offset relation of said teeth elements between said individual discs is of the order of about 15°.

5. Material shredding apparatus for reducing scrap vehicle tires into sub-products of rubber and rubber free steel wire initially employed in the manufacture of new vehicle tires, the apparatus comprising:

a) a frame structure defining a scrap vehicle tire reduction chamber;

b) an elongated cutter blade carried by said frame structure for exposure in a stationary position in said chamber;

c) an elongated rotor operably mounted in said chamber, said rotor carrying a plurality of blocks distributed along said rotor in side-by-side positions;

d) material feed chute means on said frame structure in position in alignment with blocks at opposite ends of said elongated rotor to direct vehicle tire scrap into said reduction chamber at opposite ends of said elongated rotor;

e) cutter teeth carried by each of said blocks such that the cutter teeth on said blocks are relatively off-set along the length of said rotor for progressively displacing shredded material inwardly from the opposite ends of said elongated rotor for reduction;

f) a driving motor operably connected to said rotor; and g) sub-product sizing screen means in position for retaining the material in said chamber until reduced to a predetermined size.

6. The material shredding apparatus set forth in claim 5 wherein said product sizing screen means extends along said frame below said reduction chamber, said screen having a first series of sizing apertures for rubber sub-product and a second series of sizing apertures for rubber free steel wire sub-product.

7. The material shredding apparatus set forth in claim 5 wherein a sub-product receiving tray is operably positioned beneath said reduction chamber to receive reduced material, vibratory means is connected to said tray for propelling reduced material along said tray; a material outlet formed on said tray to direct the reduced material propelled along said tray; and means adjacent said material outlet for segregating the reduced material into rubber sub-product from the rubber free steel wire sub-product.

8. The material shredding apparatus set forth in claim 5 wherein said material feed chute means is positioned in alignment with a first one of said plurality of blocks such that the off-set cutter teeth on said blocks progressively displaced the material along the length of said rotor for reduction.

* * * * *